United States Patent
Weiss (10) Patent No.: US 10,471,737 B2
(45) Date of Patent: *Nov. 12, 2019

(54) TRANSMISSIONS WITH RETENTION NOSES

(71) Applicant: Hewlett-Packard Development Company, L.P., Houston, TX (US)

(72) Inventor: Asa Weiss, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,303

(22) Filed: Oct. 30, 2018

(65) Prior Publication Data

US 2019/0077167 A1   Mar. 14, 2019

Related U.S. Application Data

(63) Continuation of application No. 15/650,848, filed on Jul. 15, 2017.

(51) Int. Cl.
| | |
|---|---|
| *B41J 7/62* | (2006.01) |
| *B41J 7/64* | (2006.01) |
| *F16H 3/00* | (2006.01) |
| *F16H 3/04* | (2006.01) |
| *B41J 7/06* | (2006.01) |
| *B41J 19/20* | (2006.01) |
| *F16H 3/08* | (2006.01) |

(52) U.S. Cl.
CPC . *B41J 7/62* (2013.01); *B41J 7/06* (2013.01); *B41J 7/64* (2013.01); *B41J 19/202* (2013.01); *F16H 3/006* (2013.01); *F16H 3/04* (2013.01); *F16H 2003/0807* (2013.01)

(58) Field of Classification Search
CPC ........................................................ B41J 7/62
USPC ..................................................... 400/161.4
See application file for complete search history.

(56) References Cited

U.S. PATENT DOCUMENTS

| | | | |
|---|---|---|---|
| 4,936,695 A | 6/1990 | Ishii | |
| 5,601,019 A | 2/1997 | Ohinata et al. | |
| 5,721,669 A * | 2/1998 | Becker ................. | G11B 33/124 |
| | | | 361/679.31 |
| 6,091,919 A * | 7/2000 | Nozawa ............. | G03G 15/0872 |
| | | | 222/DIG. 1 |
| 6,253,046 B1 | 6/2001 | Horrall et al. | |
| 6,332,658 B1 * | 12/2001 | Sato ...................... | G06F 1/1616 |
| | | | 312/223.2 |
| 7,110,693 B1 * | 9/2006 | Michlin ............. | G03G 15/0818 |
| | | | 399/109 |
| 7,274,903 B2 | 9/2007 | Carter et al. | |
| 7,398,969 B2 | 7/2008 | Elenes et al. | |
| 7,988,373 B2 * | 8/2011 | Vandermeulen ....... | B41J 15/044 |
| | | | 347/214 |
| 8,465,016 B2 | 6/2013 | Winburne et al. | |

(Continued)

*Primary Examiner* — Anthony H Nguyen
(74) *Attorney, Agent, or Firm* — HP Inc. Patent Department (57) ABSTRACT

In an example, a transmission may include a driven gear attached to a module housing of the imaging module. Further, the transmission may include a retention nose fixed or attached to the module housing. The retention nose may engage with a retention shelf of a drive housing and may retain the module housing to the drive housing such that the driven gear is operably engaged with a drive gear attached to the drive housing.

19 Claims, 7 Drawing Sheets

(56) References Cited

U.S. PATENT DOCUMENTS

| | | | | |
|---|---|---|---|---|
| 2005/0271425 A1* | 12/2005 | Shimomura | ....... | G03G 21/1647 399/258 |
| 2007/0077091 A1* | 4/2007 | Kang | ................... | G03G 15/757 399/167 |
| 2008/0077081 A1* | 3/2008 | Mounce | .............. | A61M 5/1413 604/67 |
| 2011/0081163 A1* | 4/2011 | Lee | ................... | G03G 21/1857 399/110 |
| 2013/0287447 A1* | 10/2013 | Baker | ................ | G03G 15/0886 399/260 |

* cited by examiner

TRANSMISSIONS WITH RETENTION NOSES

CROSS REFERENCE TO RELATED APPLICATION

This is a continuation of U.S. application Ser. No. 15/650,848, having a filing date of Jul. 15, 2017, which is hereby incorporated by reference in its entirety.

BACKGROUND

Electronic devices such as imaging devices, for example, may include modules to perform various tasks, or imaging operations. Such modules may be modularly engageable and/or detachable from such electronic devices. Further, such modules may include motive components, such as transmissions and other components, to aid in performing the tasks or operations that the module is designed to carry out. In some situations, such modules may be powered by and/or receive motive force from the electronic device with which the module is engaged.

DETAILED DESCRIPTION

Electronic devices such as imaging devices, for example, may include modules to perform various tasks or imaging operations. Such electronic devices may perform operations on or with media, sometimes referred to as print media, with such modules. Additionally, modules may be modularly engageable and/or detachable from such electronic devices, so as to add or remove certain functionality to or from such electronic devices. In order to carry out specific tasks and operations, modules may include motive components such as motors, gears, belts, rollers, or other components. Such motive components may move or convey, and/or perform other tasks, with or on media.

In certain situations, such motive components within a module for an electronic device may be powered by other motive components within the electronic device, which may not be part of the module. In other words, a removable module may parasitically run off of motive components within an electronic device with which the module is engaged, yet the module may lack the ability to power or drive its own motive components when the module is separated from the electronic device. Thus, in such situations, the module may have a motive component that, upon the module being inserted, attached to, or otherwise engaged with an electronic device, may operably mesh or engage with a complementary motive component of the electronic device. For example, a module may have a driven gear that may mesh with or engage with a driving gear of the electronic device.

In some situations, it may be difficult to correctly line up and mesh and/or engage a motive component of a module with a motive component of an electronic device when attempting to load, insert, or otherwise engage the module with the electronic device. The respective motive components may clash or interfere with one another during such an action. For example, the teeth of two different gears may not be properly aligned so as to mesh with each other upon the module being loaded into the electronic device. Such clashing or misalignment of the relevant motive components may result in the module not being operably engaged with the electronic device, and, thus, may not operate and perform the specific functions for which the module is employed.

In other situations, a motive component of a module may not end up being optimally connected to or engaged with a motive component of the electronic device, even when the two components are engaged in a correct manner. For example, due to the modular and/or detachable nature of a module with an electronic device, their respective motive components may not be engaged as securely as if the module were an integrated part of the electronic device. Thus, during operation of the module, reaction forces acting upon the motive components by each other may urge or even move the module out of proper engagement with the electronic device, thus impeding or even stopping proper function of the module. Thus, it may be desirable to employ a module that may securely engage with an electronic device so as to efficiently and reliably receive motive power or force from the electronic device. Further, it may also be desirable that the module correctly align with motive components of the electronic device during loading or engaging action of the module with the electronic device.

Implementations of the present disclosure provide transmissions for imaging modules that may securely engage with electronic devices, or components thereof. Further, implementations of the present disclosure provide module transmissions that may assist in aligning themselves with complementary transmissions or motive components of electronic devices with which the modules may be engaged. Yet further, example transmissions disclosed herein may engage securely with motive components of electronic devices so as to maintain reliable and efficient function of the transmissions throughout operation of the modules.

Figure 1:
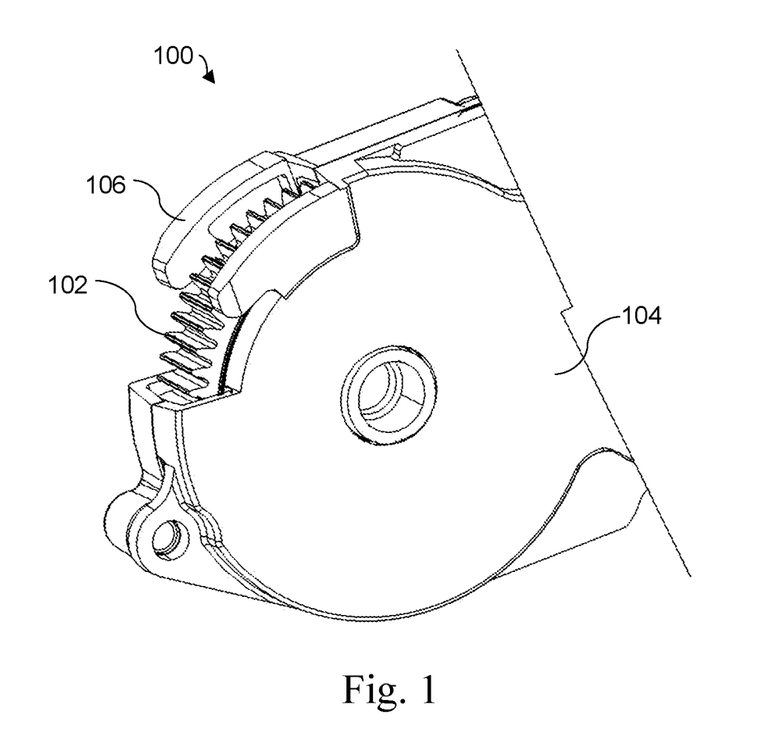
FIG. 1 is a perspective view of an example transmission.

Referring now to FIG. 1, a perspective view of an example transmission 100 for an imaging module is illustrated. The example transmission 100 may include a driven gear 102 attached to a module housing 104 of the imaging module. Further, the transmission 100 may include a retention nose 106 fixed or attached to the module housing 104. The retention nose 106 may engage with a retention shelf of a drive housing and may retain the module housing 104 to the drive housing such that the driven gear 102 is operably engaged with a drive gear attached to the drive housing.

Figure 2A:
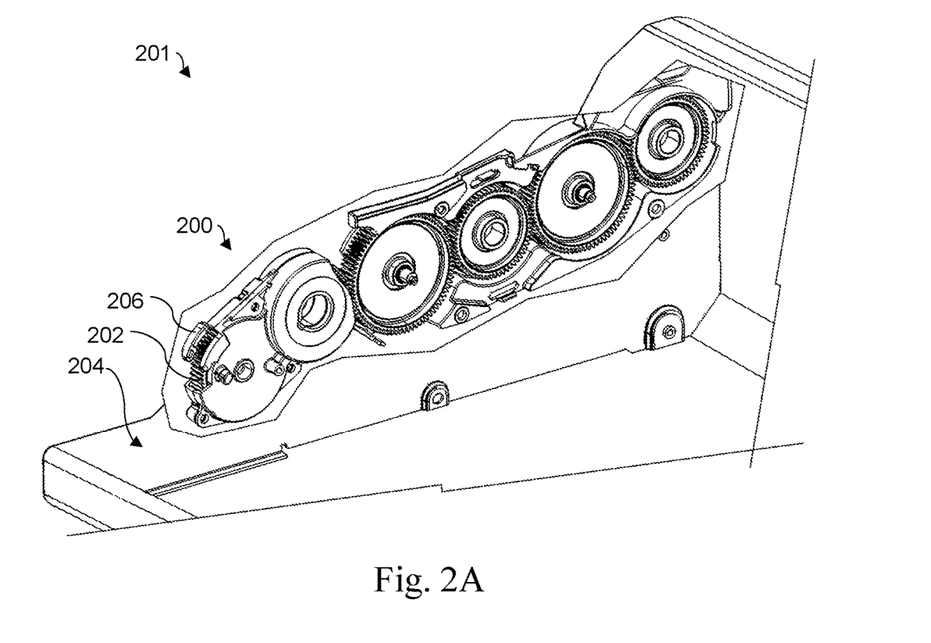
FIG. 2A is a perspective view of an example imaging module having an example transmission.

Referring now to FIG. 2A, a perspective cutaway view of an example imaging module 201 having an example transmission 200 is illustrated. Example transmission 200 may be similar to example transmission 100, described above. Further, the similarly-named elements of example transmission 200 may be similar in function and/or structure to the respective elements of example transmission 100, as they are described above. Example imaging module 201 may be a portion of an electronic device, or, in some examples, an imaging device. Further, the imaging module 201 may be a supplementary component for use with an imaging device.

In other words, the imaging module 201 may provide additional functionality or ability to an imaging device, yet the imaging device may be able to function in other ways without the imaging module 201. Additionally, the imaging module 201 may have a module housing 204, which may mechanically engage with the imaging device, and or a receiving bay or module bay thereof. The imaging module 201 may include a transmission 200. In some implementations, the transmission 200 may be attached to or disposed on the module housing 204. Note, the imaging module 201 is illustrated in partial form for clarity. The imaging module 201 may have additional components or structure, in some implementations.

Figure 2B:
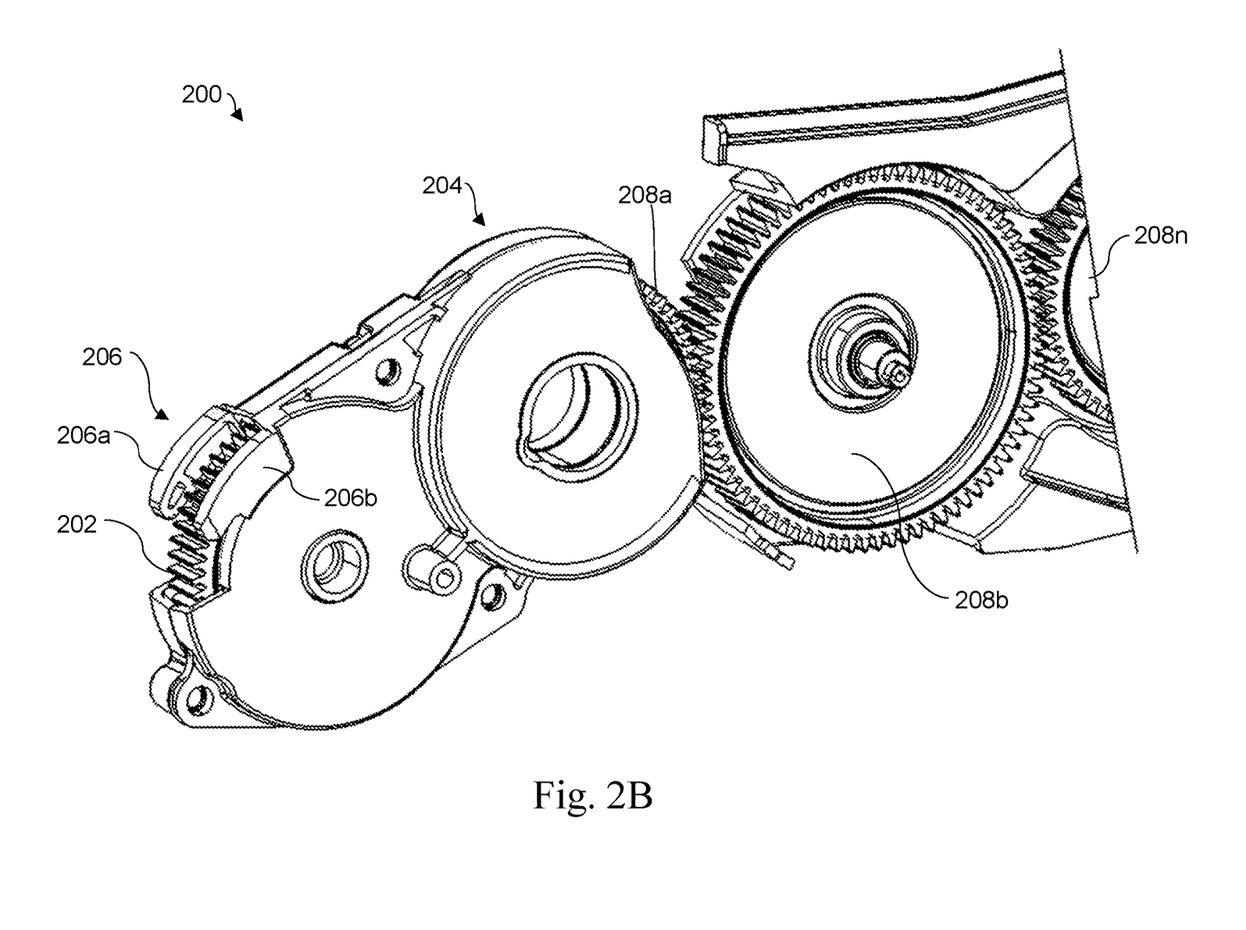
FIG. 2B is a perspective detail view of an example transmission.

Referring additionally to FIG. 2B, a detail view of the transmission 200 of the imaging module 201 is illustrated. The transmission 200 may include a driven gear 202 and a gear train disposed in or on the module housing 204. It should be noted that, while FIG. 2B illustrates the module housing 204 as encasing or supporting the driven gear 202 and the gear train, module housing 204 may refer to other support structure of the imaging module 201, or to the components and structure supporting the imaging module 201 as a whole, as illustrated in FIG. 2A.

The gear train may be represented by motive components 208a, 208b . . . 208n, and may hereinafter be referred to as gear train 208. The gear train 208 may include a plurality of gears operably engaged with each other. Stated differently, the gear train 208 may be a series of gears or cogs operably engaged with one another through complementary meshing teeth. Further, the gear train 208 may include more or fewer motive components than as illustrated. Yet further, while illustrated as cogs or gears, the motive components comprising the gear train 208 may be other types of motive components, such as friction wheels, rollers, or other components, and may also include suitable additional or intermediary components, e.g., chains, belts, motors, clutches, pulleys, bearings, or other components suitable for use in a transmission.

The driven gear 202 may also be a gear or cog with teeth, in some implementations. Similar to the gear train 208, while illustrated as a gear or cog, it is contemplated that the driven gear 202 may, in some implementations, be another type of motive component such as a friction wheel or roller. Further, the driven gear 202 may be operably engaged directly with the gear train 208, or indirectly through intermediary components such as belts, chains, or other suitable components. In this context, operably engaged may refer to a structure and/or engagement of one motive component with another (e.g., the driven gear 202 and the gear train 208) wherein one motive component may transmit torque and/or rotational motion and/or force to and along the other motive component. In other words, the driven gear 202 may drive the gear train 208 if a torque or rotational force is applied to the driven gear 202. Further, the driven gear 202 may be partially disposed and encased within the module housing 204, and may also be partially exposed so as to engage with another motive component outside of the imaging module 201, for example, a drive gear. Therefore, the driven gear 202 may receive torque and/or rotational motion and force from such an outside motive component and transmit such motion through the gear train 208 and/or the rest of the transmission 200.

The imaging module 201, or the transmission 200 thereof, may also include a retention nose 206 extending from the module housing 204 adjacent to the driven gear 202. In some implementations, the retention nose 206 may be a unitary or integrated part of the module housing 204, and, in other implementations, the retention nose 206 may be a separate or discrete component which may be assembled on to the module housing 204 or another portion of the imaging module 201. In some implementations, the retention nose 206 may be a single component, extending over the driven gear 202. In other implementations, the retention nose 206 may comprise more than one nose portion. For example, the retention nose 206 may include a first nose portion 206a and a second nose portion 206b, adjacent to the first nose portion 206a. In further implementations, the first nose portion 206a and the second nose portion 206b may be like structures, and extend in like dimensions from the module housing 204. In yet further implementations, the first nose portion 206a and the second nose portion 206b may be symmetric, or may have mirror-image-like structures relative to one another. In some implementations, the first nose portion 206a may be disposed on a first side of the driven gear 202, and the second nose portion 206b may be disposed on a second side of the driven gear 202. In other words, the first nose portion 206a and the second nose portion 206b may each be disposed adjacent to the driven gear 202 and adjacent to one another across an axial thickness of the driven gear 202. The first side and the second side of the driven gear 202 may be opposing sides of the driven gear 202 across the axial thickness of the driven gear 202. Stated yet differently, the retention nose 206 may include multiple portions such that the retention nose 206 straddles the driven gear 202 and may overlap the driven gear 202.

Figure 2C:
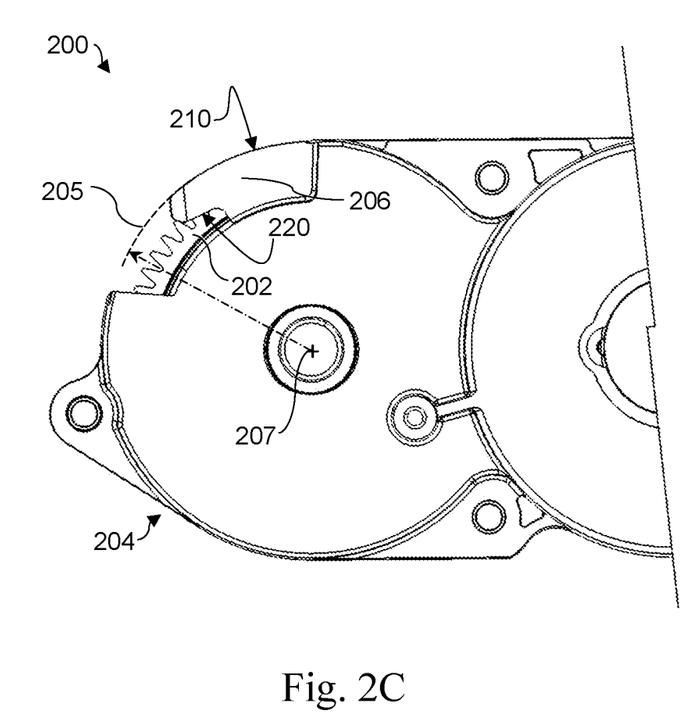
FIG. 2C is a side view of an example transmission.

Referring additionally to FIG. 2C, a side view of the transmission 200 is illustrated. The retention nose 206 may extend from the module housing 204 in an arc or arcuate (or otherwise curved) manner. The retention nose 206 may extend over an exposed portion of the driven gear 202 so as to engage with a portion of, or a housing attached to, an outside motive component (e.g., a drive gear) which may be engaged with the driven gear 202. In further implementations, the retention nose 206 may extend from the module housing 204 so as to mate with, interface with, or otherwise retainably engage with a retention shelf or another portion of a drive housing having a drive gear with which the driven gear 202 may be operably engaged. In some implementations, the retention nose 206 may extend at least partially along a circumference of the driven gear 202. In yet further implementations, the retention nose 206 may have an outer engagement surface 210 that is about concentric to a center of rotation 207 of the driven gear 202. One example of such concentricity may be represented by reference line 205 in FIG. 2C. The outer engagement surface 210 may abut or press against a mating surface of the drive housing, adjacent to or near the retention shelf.

In further implementations, the retention nose 206 may also include a retention latch 220. The retention latch 220 may be an overhang, ledge, or another type of cavity or recess capable of latching on to a retention shelf or another portion of a drive housing so as to hold the module housing 204, and thus the driven gear 202, against or towards the drive housing, as will be discussed in further detail below.

Figure 3A:
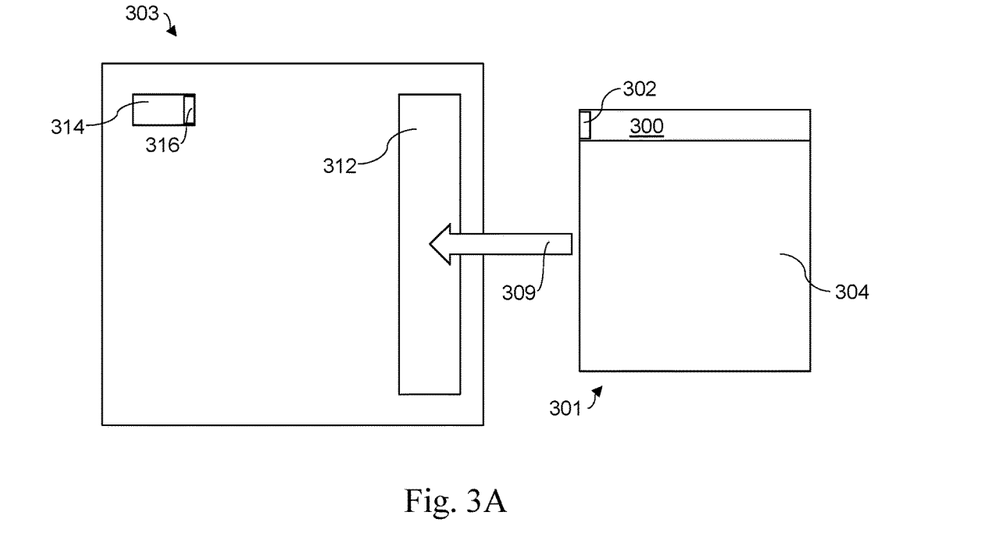
FIG. 3A is a schematic view of an example electronic device having an example transmission.

Referring now to FIG. 3A, a schematic view of an example electronic device 303 having an example transmission 300 for an imaging module 301 is illustrated wherein the imaging module 301 is disassembled, removed, or otherwise separated from engagement with the electronic device 303. Example transmission 300 and imaging module 301 may be similar to other example transmissions and imaging modules described above. Further, the similarly-named elements of example transmission 300 and imaging module 301 may be similar in function and/or structure to the respective elements of other example transmissions and imaging modules, as they are described above. In some implementations, the electronic device 303 may be an imaging device 303, and may hereinafter be referred to as such. It should be noted that, in other implementations, it is contemplated that the electronic device may be another type of electronic device with a removable module having a transmission. The imaging device 303 may be a device for performing imaging operations on or with media, sometimes referred to as print media, or a medium thereof. In further implementations, the imaging device 303 may be a printer (or may include a printer or printing system), a copier, scanner, all-in-one multi-function device, or another type of imaging device.

In some implementations, the imaging device 303, or a printer thereof or therein, may include a module bay 312 to receive and mechanically engage with and support the imaging module 301. The imaging module 301 may be a supplementary device to provide additional functionality to the imaging device 303. In some implementations, the imaging device 303 may be capable of performing some functions and/or imaging operations without the assistance of the imaging module 301. In further implementations, the imaging device 303 may be capable of printing on print media, or otherwise carrying out other imaging operations on or with the print media, while the imaging module 301 may provide supplementary actions such as collating, stapling, or otherwise reorienting the print media either before or after the imaging device 303 has performed imaging operations with the media. In further implementations, the imaging module 301 may be a duplexer module, which may enable the imaging device 303 to carry out duplexing imaging operations. In other words, the duplexer module may enable the imaging device 303 to print or perform other imaging operations on both sides of a sheet of print media. Stated differently, the imaging module 301 may receive sheets of print media from the imaging device 303, flip the sheets of print media over, and then convey the sheets of print media back to the imaging device 303 for further imaging operations.

In some implementations, the imaging module 301 may not perform actions under its own power or influence. In such a situation, the imaging module 301 may parasitically draw motive energy from a motive component or transmission of the imaging device 303. As such, the imaging device 303 may include a transmission, referred to as a printer transmission in implementations wherein the imaging device 303 is or includes a printer. The printer transmission may include motive elements such as motors, gears, belts, chains, clutches, rollers, drive shafts, or other suitable components for conveying print media and enabling the functions of the imaging device 303. In some implementations, the printer transmission may include a drive gear 316 engaged with a drive housing 314. The drive gear 316, and/or other components of the printer transmission, may be, at least partially, disposed in or exposed to the module bay 312. In some implementations, the drive gear 316 may be connected to a drive shaft and may be responsible for driving other components within the imaging device 303. For example, the drive gear 316 may drive at least one media roller to convey print media, at least partially, through the imaging device 303. Additionally, the drive gear 316 may be oriented or structured so as to be able to provide motive power and/or torque or rotational force and motion to another motive component which may be insertable into, and removable from, the module bay 312 (e.g., a driven gear 302 of the imaging module 301).

Referring still to FIG. 3A, the imaging module 301 may have a transmission 300 having a driven gear 302. Further, the imaging module 301 may be modularly insertable into and detachable from the module bay 312. In other words, the imaging module 301, or a module housing 304 thereof, may detachably load into the module bay 312 of the imaging device 303. That is, the imaging module 301 as a whole may be engageable with the imaging device 303, and the functions of the imaging module 301 may be largely separated from the functions of the imaging device 303 as opposed to being integrated with them. Thus, the imaging module 301 may detachably engage with the module bay 312. The imaging module 301 may include a module housing 304 having a retention nose extending from the module housing 304. Note, in some implementations, the retention nose may be considered as being a constituent component of the transmission 300. The retention nose may extend from the module housing 304 towards an engagement direction 309 of the imaging module 301 with the module bay 312. Thus, upon the imaging module 301 being engaged with, loaded, or inserted into the module bay 312, the retention nose is oriented so as to be able to interface with or engage with a feature or features of the imaging device 303 (or the drive housing 314 thereof) which may be disposed inside of the module bay 312.

Figure 3B:
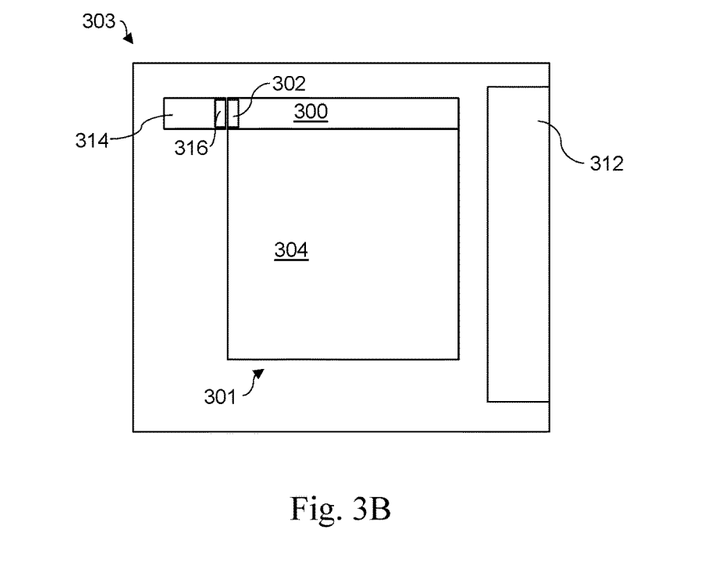
FIG. 3B is a schematic view of an example electronic device having an example transmission.

Referring now to FIG. 3B, a schematic view of the example imaging device 303 having the example transmission 300 for the imaging module 301 is illustrated, wherein the imaging module 301 has been loaded into or engaged with the module bay 312 of the imaging device 303. The imaging module 301 has been engaged with the imaging device 303 so as to engage the transmission 300, and thus the driven gear 302 thereof, with the printer transmission of the imaging device, and thus the drive gear 316 thereof. Stated differently, the driven gear 302 has been operably engaged with the drive gear 316 such that the driven gear 302 can be driven by the drive gear 316, thus receiving torque and/or rotational force and motion from the drive gear 316. Thus, the driven gear 302 and the transmission 300 to which it is operably attached, is able to parasitically draw motive energy from the imaging device 303 when the imaging module 301 is engaged with the imaging device 303.

Figure 4A:
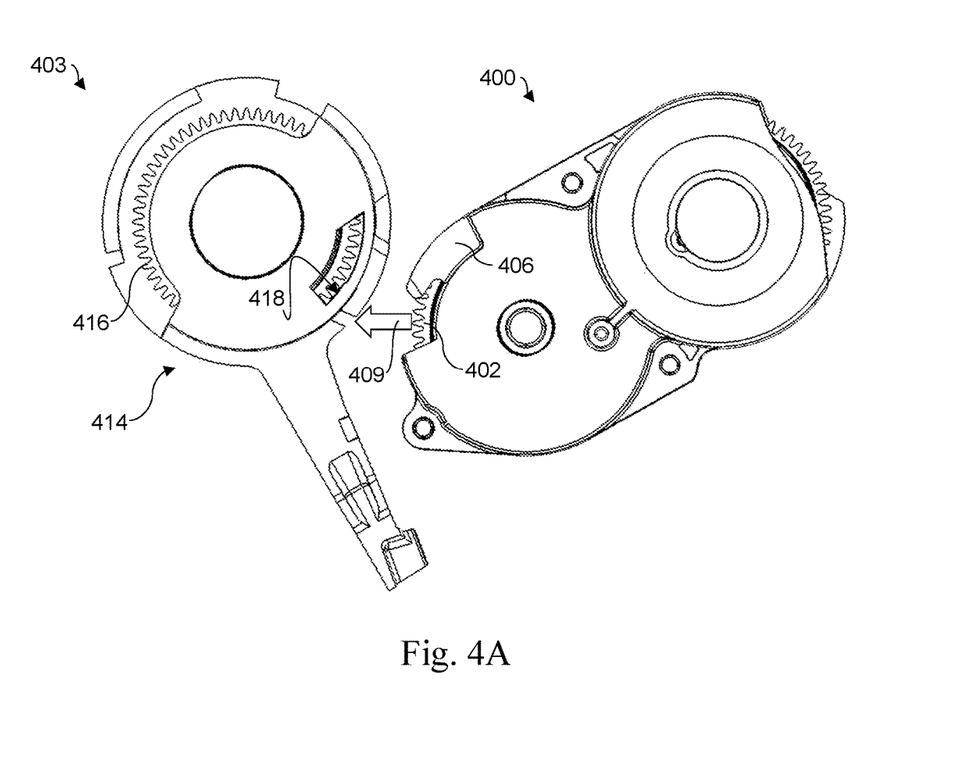
FIG. 4A is a side view of an example imaging device having an example transmission.

Referring now to FIG. 4A, a side view of an example imaging device 403 having an example transmission 400 for an imaging module is illustrated. Example imaging device 403 and transmission 400 may be similar to other example imaging devices and transmissions described above. Further, the similarly-named elements of example imaging device 403 and transmission 400 may be similar in function and/or structure to the respective elements of other example imaging devices and transmissions, as they are described above. Note, only portions of the transmission 400 and the imaging device 403 are shown for clarity in FIGS. 4A-4B. Specifically, FIG. 4A shows a driven gear 402 of the transmission 400 as it is operably engaging with a drive gear 416 and drive housing 414 of the imaging device 403. The transmission 400 and drive gear 402 may be engaged with or attached to a module housing of the imaging module, which is not shown. Similarly, the drive housing 414 and drive gear 416 may also be engaged with elements that are not shown, for example, an imaging device transmission, and may be, at least partially, disposed within a module bay of the imaging device, also not shown.

The driven gear 402, and thus the transmission 400, is moved along an engagement direction 409 in order to operably engage with the drive gear 416 and the drive housing 414. The drive gear 416 may be a complementary motive component that is able to operably engage with the driven gear 402 of the imaging module. The drive gear 416 may be a motive component capable of transmitting torque and/or rotational force and motion. In some implementations, the drive gear 416 may be a gear or cog with teeth or other protrusions to operably mesh with complementary features of the driven gear 402. In other implementations, the drive gear 416 may be another component suitable for use in a transmission, for example a friction wheel, a roller, or another type of motive component.

In some implementations, the drive housing 414 may have a retention shelf 418 to engage with a retention nose 406 of the transmission 400 when the drive gear 416 is operably engaged with the driven gear 402. In other words, upon the imaging module being loaded into the module bay of the imaging device 403, the driven gear 402 may move along the engagement direction 409 until the driven gear 402 engages and/or meshes with the drive gear 416 and the retention nose 406 (or a retention latch thereunder) latches on to or otherwise interfaces with the retention shelf 418.

Figure 4B:
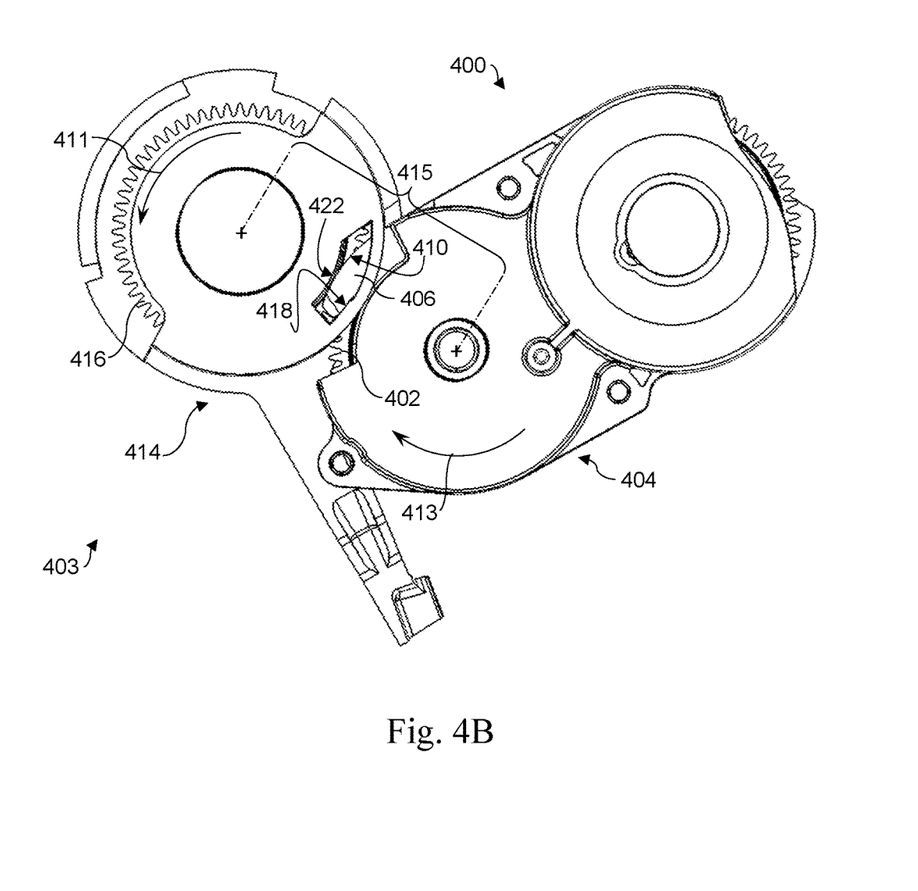
FIG. 4B is a side view of an example imaging device having an example transmission.

Referring additionally to FIG. 4B, a side view of the example imaging device 403 and transmission 400 is illustrated wherein the driven gear 402 has been fully operably engaged with the drive gear 416 and the retention nose 406 has engaged with the retention shelf 418. The retention nose 406 has engaged with or mated with the retention shelf 418 so as to hold the driven gear 402 into or towards operable engagement with the drive gear 416. This engagement may occur, in some implementations, upon the imaging module being fully disposed or loaded into the module bay of the imaging device 403. Additionally, the action of the retention nose 406 engaging with the retention shelf 418 may help properly align the driven gear 402 with the drive gear 416 to avoid the two components clashing against one another and to avoid potential improper engagement of the two gears during loading and/or engagement.

Further, the drive gear 416 may rotate in a manner similar to arrow 411 in order to drive the driven gear 402 in a corresponding manner, represented by arrow 413, during operation of the imaging module. The retention nose 406 may extend from a module housing 404 circumferentially to the driven gear 402 in a direction that is opposite to the rotational direction 413 that the driven gear 402 is driven by the drive gear 416. Thus, during such operation, the retention nose 406 may be sufficiently latched on to or interfaced with the retention shelf 418 so as to hold the driven gear 402 into engagement with the drive gear 416. Such engagement of the retention nose 406 with the retention shelf 418 ensures that the reaction forces that exist between the drive gear 416 and the driven gear 402 during operation do not urge or even move the drive gear 402, and thus the transmission 400 and the imaging module, towards a disengagement direction from the module bay. Further, such an orientation of the retention nose 406 may even cause the reaction forces between the driven gear 402 and the drive gear 416 to urge or pull the gears further towards operable engagement. Thus, the retention nose 406 may ensure reliable operation of the imaging module while being driven by the imaging device.

Additionally, the retention nose 406 may have an outer engagement surface 410 that may be about concentric to a center of rotation of the driven gear 402. The outer engagement surface 410 may mate with or abut against a mating surface 422 of the drive housing 416. In some implementations, the mating surface 422 may, itself, be about concentric to a center of rotation of the drive gear 416. The mating surface 422 may be adjacent to the retention shelf 418 such that, when engaged with the retention nose 406, the retention nose 406 is disposed in between the retention shelf 418 and the mating surface 422. The outer engagement surface 410 may be concentric to the driven gear 402 sufficiently that its abutment with the mating surface 422 may maintain a center-to-center spacing 415 of the driven gear 402 and the drive gear 416 throughout operation of the imaging module. This may also help ensure reliable and efficient engagement of the driven gear 402 with the drive gear 416.

What is claimed is:

1. A module housing for an imaging module, comprising:
    a drive gear disposed in the module housing; and
    a retention nose fixed to the module housing and extending from the module housing in an engagement direction adjacent the driven gear and over an exposed portion of the driven gear.

2. The module housing of claim 1, wherein the retention nose extends in an arc in the engagement direction.

3. The module housing of claim 2, wherein the engagement direction is a direction of engagement of the imaging module with an imaging device.

4. The module housing of claim 1, wherein the retention nose is to engage with a retention shelf of a drive housing having a drive gear to retain the module housing to the drive housing.

5. The module housing of claim 4, wherein the driven gear is to operably engage with the drive gear when the retention nose is engage with the retention shelf.

6. An imaging module, comprising:
    a module housing to engage with a drive housing having a drive gear;
    a transmission having a driven gear disposed in the module housing and
    a retention nose extending in an arc from the module housing over an exposed portion of the driven gear.

7. The imaging module of claim 6, wherein the retention nose is to mate with a retention shelf of the drive housing upon the module housing being engaged with the drive housing.

8. The imaging module of claim 7, wherein the retention nose is to hold the driven gear in to operable engagement with the drive gear when the retention nose is engaged with the retention shelf.

9. The imaging module of claim 6, wherein the retention nose has an outer engagement surface that is about concentric to a center of rotation of the driven gear.

10. The imaging module of claim 6, further comprising a gear train operably engaged with the driven gear.

11. The imaging module of claim 6, wherein the retention nose comprises a first nose portion and a second nose portion disposed adjacent the first nose portion.

12. The imaging module of claim 11, herein the first nose portion and the second nose portion are symmetric to one another.

13. The imaging module of claim 11, wherein the first nose portion and the second nose portion are disposed adjacent to one another across an axial thickness of the driven gear.

14. An imaging device, comprising:
    a printer having a module bay;
    a printer transmission having a drive gear; and
    an imaging module to detachably engage with the module bay, the imaging module comprising:
        a module housing having a retention nose extending from the module housing and
        a driven gear disposed within the module housing to engage with and be driven by the drive gear, wherein the retention nose extents over an exposed portion of the driven gear and is to engage with a retention shelf of the primer transmission upon the imaging module being engaged with the module bay.

15. The imaging device of claim 14, wherein the engagement of the retention nose with the retention shelf is to hold the driven gear into operable engagement with the drive gear.

16. The imaging device of claim 15, wherein the retention nose includes a retention latch to latch on to the retention shelf.

17. The imaging device of claim 14, wherein the retention nose is to extend circumferentially to the driven gear in a direction opposite to a rotational direction of the driven gear.

18. The imaging device of claim 17, wherein the rotational direction is a direction in which the driven gear is driven by the drive gear.

19. The imaging device of claim 14, wherein the retention nose has an outer engagement surface to abut against a mating surface of a drive housing, the mating surface disposed adjacent to the retention shelf.

\* \* \* \* \*

UNITED STATES PATENT AND TRADEMARK OFFICE
CERTIFICATE OF CORRECTION

PATENT NO. : 10,471,737 B2  
APPLICATION NO. : 16/175303  
DATED : November 12, 2019  
INVENTOR(S) : Asa Weiss Page 1 of 1

It is certified that error appears in the above-identified patent and that said Letters Patent is hereby corrected as shown below:

In the Claims

In Column 8, Line 12, Claim 1, delete "drive" and insert -- driven --, therefor.

In Column 8, Line 28, Claim 5, delete "engage" and insert -- engaged --, therefor.

In Column 8, Line 33, Claim 6, delete "housing" and insert -- housing; --, therefor.

In Column 8, Line 41, Claim 8, delete "in to" and insert -- into --, therefor.

In Column 8, Line 52, Claim 12, delete "herein" and insert -- wherein --, therefor.

In Column 8, Line 65, Claim 14, delete "housing" and insert -- housing; --, therefor.

In Column 9, Line 1, Claim 14, delete "extents" and insert -- extends --, therefor.

In Column 9, Line 3, Claim 14, delete "primer" and insert -- printer --, therefor.

Signed and Sealed this  
Seventeenth Day of March, 2020

Andrei Iancu  
*Director of the United States Patent and Trademark Office*